US011592296B2

(12) United States Patent
Morita et al.

(10) Patent No.: US 11,592,296 B2
(45) Date of Patent: Feb. 28, 2023

(54) NAUTICAL CHART DISPLAY DEVICE, NAUTICAL CHART DISPLAY METHOD, AND NAUTICAL CHART DISPLAY PROGRAM

(71) Applicant: Furuno Electric Co., Ltd., Nishinomiya (JP)

(72) Inventors: Takatoshi Morita, Nishinomiya (JP); Masato Okuda, Kyoto (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 0 days.

(21) Appl. No.: 16/833,050

(22) Filed: Mar. 27, 2020

(65) Prior Publication Data
US 2020/0225042 A1    Jul. 16, 2020

Related U.S. Application Data

(63) Continuation-in-part of application No. PCT/JP2018/031629, filed on Aug. 28, 2018.

(30) Foreign Application Priority Data

Sep. 29, 2017    (JP) .............................. JP2017-189292

(51) Int. Cl.
*G01C 21/22*    (2006.01)
*B63B 49/00*    (2006.01)
(Continued)

(52) U.S. Cl.
CPC .............. *G01C 21/22* (2013.01); *B63B 49/00* (2013.01); *G06F 3/0488* (2013.01);
(Continued)

(58) Field of Classification Search
CPC ...... G01C 21/22; G01C 21/203; B63B 49/00; G06F 3/04845; G06F 3/04847;
(Continued)

(56) References Cited

U.S. PATENT DOCUMENTS 3,816,928 A * 6/1974 Fessenden ............. G01C 21/20
33/1 C
2006/0206264 A1* 9/2006 Rasmussen ............... G06T 3/40
701/455
(Continued)

FOREIGN PATENT DOCUMENTS

EP    1947558 A2    7/2008
EP    2711829 A1    3/2014
(Continued)

OTHER PUBLICATIONS

European Patent Office, Extended European Search Report Issued in Application No. 18863659.1, dated May 12, 2021, Germany, 8 pages.

*Primary Examiner* — William A Beutel
(74) *Attorney, Agent, or Firm* — Alleman Hall Creasman & Tuttle LLP (57) ABSTRACT

The purpose is to provide a nautical chart display device which enables a measurement of a distance on an electronic nautical chart, like a measuring method which is performed by using a divider. The nautical chart display device includes a display unit, an operation detector, a registration processing module, and a change processing module. The display unit has a screen and displays a nautical chart on the screen. The operation detector detects a touch operation to the screen. The registration processing module accepts two points of the touch operation on the screen, and registers a scale at which a distance between the touched points on the screen matches a distance setting on the nautical chart as an additional scale. The change processing module changes the scale of the nautical chart to the additional scale.

20 Claims, 8 Drawing Sheets (51) Int. Cl.
  *G06F 3/04845* (2022.01)
  *G06F 3/04847* (2022.01)
  *G06F 3/0488* (2022.01)
(52) U.S. Cl.
  CPC ...... *G06F 3/04845* (2013.01); *G06F 3/04847* (2013.01); *G06F 2203/04806* (2013.01); *G06F 2203/04808* (2013.01)
(58) Field of Classification Search
  CPC ......... G06F 3/0488; G06F 2203/04806; G06F 2203/04808; G06F 3/0484; G09B 29/00; G09B 29/10
  See application file for complete search history.

(56) References Cited

U.S. PATENT DOCUMENTS

| | | | |
|---|---|---|---|
| 2008/0174563 A1 | 7/2008 | Kim | |
| 2011/0242136 A1* | 10/2011 | Yamada | G01C 21/367 345/660 |
| 2013/0265250 A1* | 10/2013 | Ishikawa | G06F 3/0488 345/173 |
| 2013/0286022 A1* | 10/2013 | Kubota | G01S 7/10 345/440 |
| 2014/0085671 A1 | 3/2014 | Nakagawa | |
| 2014/0250401 A1* | 9/2014 | Matsumoto | G01C 21/203 715/771 |
| 2014/0258935 A1* | 9/2014 | Nishida | G06F 3/0227 715/833 |
| 2015/0033176 A1* | 1/2015 | Miichi | G06F 3/0484 715/771 |
| 2015/0035772 A1 | 2/2015 | Asahara et al. | |
| 2019/0277649 A1* | 9/2019 | Takayama | G01C 21/36 |

FOREIGN PATENT DOCUMENTS

| | | |
|---|---|---|
| EP | 2765075 A1 | 8/2014 |
| JP | 2014063428 A | 4/2014 |
| WO | 2013051047 A1 | 4/2013 |
| WO | 2013051051 A1 | 4/2013 |

* cited by examiner

| ID | INTER-TOUCH DISTANCE | DISTANCE SETTING | REQUIRED TIME (SHIP SPEED) | ADDITIONAL SCALE |
|---|---|---|---|---|
| 1 | INTER-TOUCH DISTANCE A | 5NM | | 1/W |
| 2 | INTER-TOUCH DISTANCE B | | 30min (20kn) | 1/X |
| 3 | INTER-TOUCH DISTANCE C | 5NM | | 1/Y |
| | | 30NM | | 1/Z |

NAUTICAL CHART DISPLAY DEVICE, NAUTICAL CHART DISPLAY METHOD, AND NAUTICAL CHART DISPLAY PROGRAM

CROSS-REFERENCE TO RELATED APPLICATION(S)

This application is a continuation-in-part of PCT International Application PCT/JP2018/031629, which was filed on Aug. 28, 2018, and which claims priority to Japanese Patent Application Ser. No. 2017-189292 filed on Sep. 29, 2017, the entire disclosures of each of which are herein incorporated by reference for all purposes.

TECHNICAL FIELD

The present disclosure mainly relates to a nautical chart display device which displays a nautical chart.

BACKGROUND ART

Patent Document 1 discloses a display device which displays navigational information including a nautical chart. This display device is configured as a touch panel, and executes various processings based on touch operations to a screen. For example, a scale of the nautical chart is changed by moving two fingers touching on the screen closer to and apart from each other, without the fingers being separated from the screen. Moreover, by touching two points on the screen with the fingers while the nautical chart is displayed, a distance on the nautical chart between the two touched points is displayed on the screen.

REFERENCE DOCUMENT OF CONVENTIONAL ART

Patent Document

Patent Document 1: WO2013/051051A1

DESCRIPTION OF THE DISCLOSURE

Problem to be Solved by the Disclosure

Here, when measuring the distance between given two points on a paper nautical chart, a divider is first set on a scale line (e.g., a latitude scale) on the nautical chart so that a span between two points of the divider is set to a given length (e.g., 1 NM) on the nautical chart. Then, by obtaining how many times of the span of the divider (i.e., the given length on the nautical chart) a measuring object is, and performing a multiplication, the distance of the measuring object on the nautical chart can be measured.

On the other hand, the electronic nautical chart of Patent Document 1 can measure the distance of the measuring object on the nautical chart, only by performing the touch operation on the nautical chart as described above. However, such an operation may be difficult to understand for a user who is used to the conventional measuring method.

The present disclosure is made in view of the situation described above, and a primary purpose thereof is to provide a nautical chart display device which enables a measurement of a distance on an electronic nautical chart, like a measuring method which is performed by using a divider.

SUMMARY

The problem to be solved by the present disclosure is as described above, and measures to solve the problem and effects thereof are described as follows.

According to one aspect of the present disclosure, a nautical chart display device having the following configuration is provided. That is, the nautical chart display device includes a display unit, an operation detector, a registration processing module, and a change processing module. The display unit has a screen and displays a nautical chart on the screen. The operation detector detects a touch operation to the screen. The registration processing module registers a scale at which an inter-touch distance that is a distance between two points of the detected touch operation to the screen matches a distance setting on the nautical chart as an additional scale. The change processing module changes the scale of the nautical chart to the additional scale.

According to this configuration, since the additional scale can be registered by touching two points with an arbitrary span therebetween, the additional scale can be registered, for example, by using a span between two fingers of a user when a hand is open, and therefore, the nautical chart can be displayed at the additional scale according to a size of user's hand etc. By displaying the nautical chart at this registered additional scale, a distance on the nautical chart can be measured by using user's hand in a method similar to using a divider.

MODES FOR CARRYING OUT THE DISCLOSURE

Figure 1:
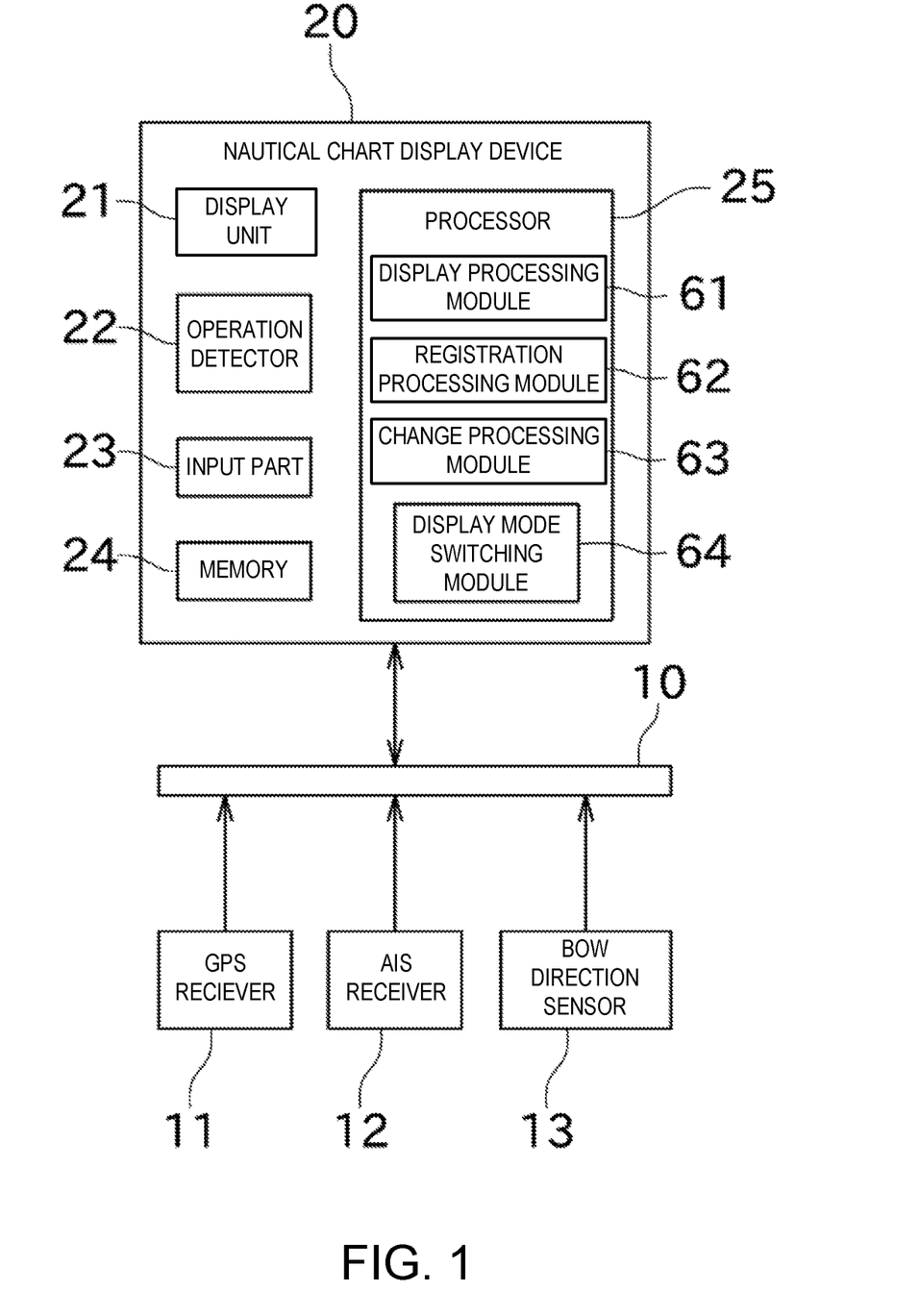
FIG. 1 is a block diagram of an electronic nautical chart displaying network system including a nautical chart display device according to one embodiment of the present disclosure.

Next, one embodiment of the present disclosure will be described with reference to the drawings. First, an electronic nautical chart displaying network system 1 is described with reference to the FIG. 1. FIG. 1 is a block diagram of the electronic nautical chart displaying network system 1 including a nautical chart display device 20 of this embodiment.

The electronic nautical chart displaying network system 1 may be mounted on a ship and configured to display various information required for navigation. As illustrated in FIG. 1, the electronic nautical chart displaying network system 1 may include a GPS receiver 11, an AIS receiver 12, a bow direction sensor 13, and the nautical chart display device 20. Moreover, each of the marine equipment configuring the electronic nautical chart displaying network system 1 may be connected to each other via a marine network 10.

The marine network 10 may be a network for communication between the marine equipment on the same ship. The respective marine equipment can exchange detected information etc. via the marine network 10. The marine network 10 may be a LAN (Local Area Network), and in detail, Ethernet®, a CAN (Controller Area Network), or NMEA (National Marine Electronics Association) may be used. Note that at least one of the GPS receiver 11, the AIS receiver 12, and the bow direction sensor 13 may be connected directly with the nautical chart display device 20 using a cable etc., without being connected via the marine network 10.

The GPS receiver 11 may receive positioning signals from GPS satellites via GPS antennas (not illustrated). The GPS receiver 11 may acquire a position of the ship (in detail, positions of the GPS antennas, and an absolute position of the ship based on the terrestrial reference) based on the positioning signals, and transmit it to the nautical chart display device 20. Note that, instead of the GPS receiver 11, a receiver for acquiring the position of the ship by using a GNSS other than the GPS (e.g., GLONASS or GALILEO) may be used.

The AIS receiver 12 may receive an AIS signal transmitted from another ship. The AIS (Universal Shipborne Automatic Identification System) is a system which transmits the positional information, the navigational information, etc. of the ship to the surroundings thereof wirelessly. The AIS receiver 12 may receive the AIS signal transmitted from another ship and analyze it to acquire information on an absolute position, a destination, etc. of another ship (AIS information). The AIS receiver 12 may transmit the acquired AIS information to the nautical chart display device 20. The AIS information may include a name, the absolute position, a course, and the destination of another ship. Note that the analysis of the AIS signal may be performed by the nautical chart display device 20.

The bow direction sensor 13 may detect a bow direction of the ship (a direction in which a bow of the ship is directed) as an absolute azimuth based on the terrestrial reference. A magnetic direction sensor, a GPS compass, a gyrocompass, etc. may be used as the bow direction sensor 13. The bow direction sensor 13 may transmit the detected bow direction to the nautical chart display device 20.

The nautical chart display device 20 may be a device for displaying an electronic nautical chart. The nautical chart display device 20 of this embodiment may be a comparatively large in the size (e.g., a screen size of 30 inches or larger, or 40 inches or larger), and may be disposed so that a displaying screen becomes parallel with a horizontal direction. Note that the nautical chart display device 20 may have the screen size smaller than 30 inches, or the displaying screen thereof may be disposed at or near vertical.

The term "horizontal direction" as used herein may refer to a direction including a plane parallel to a floor surface on which the nautical chart display device 20 is disposed, in addition to a plane perpendicular to the vertical direction. Moreover, the "horizontal direction" as used herein may not strictly be a direction perpendicular to the vertical direction, or parallel to the floor surface, but include a case of having an angle of 10° or less. Also, a case in which an inclination angle of the screen of the nautical chart display device 20 is changeable may correspond to "the nautical chart display device 20 may be disposed so that the screen becomes parallel with the horizontal direction," as long as the inclination angle can be changed to direct toward the horizontal direction.

As illustrated in FIG. 1, the nautical chart display device 20 may include a display unit 21, an operation detector 22, an input part 23, a memory 24, and a processor 25.

The display unit 21 may be a unit having the screen on which electronic data can be displayed by using diagram(s) and character(s). The display unit 21 is, for example, a liquid crystal display, but may be a plasma display, an organic electro-luminescence display, etc. Although in this embodiment the screen of the display unit 21 has a rectangular shape, it may have a different shape, such as a square shape.

The operation detector 22 may be a touch panel of a capacitance-type etc. disposed on the screen of the display unit 21. The operation detector 22 may be capable of detecting a touch operation (a touch gesture), which is an operation of a user touching on the screen with his/her finger(s), an operation tool, etc. Note that a hardware key may be disposed in addition to the touch panel. The operation detector 22 may output an electrical signal corresponding to the user's touch operation (corresponding to a change of a touched point).

The touch operation may include "a drag operation," "a pinching operation," and "a rotating operation," other than the operation of touching one point or a plurality of points. The drag operation may be an operation of moving finger(s) touching the screen in a given direction without the finger(s) being separated from the screen. This drag operation may correspond to processing to scroll the nautical chart. The pinching operation may be an operation of moving two fingers touching the screen, closer to each other (pinch-in operation) or away from each other (pinch-out operation), without the fingers being separated from the screen. This pinching operation may correspond to processing to change a scale of the nautical chart. The rotating operation may be an operation of touching the screen with two fingers and rotating one finger around the other finger, or an operation of rotating the two fingers touching the screen centering on a center of the two fingers as a rotational center. This rotating operation may correspond to processing to rotate the nautical chart (to change a direction of the nautical chart with respect to the direction of the screen).

The input part 23 may accept an input of the electrical signal outputted from the operation detector 22. The input part 23 may receive an input of a signal outputted from an external device of the nautical chart display device 20, in addition to the electrical signal outputted from the operation detector 22. In detail, the input part 23 may be an input port etc. to which the signal outputted from the operation detector 22 or the signal outputted from the external device is inputted. The processor 25 may execute processing according to the signal inputted into the input part 23.

The memory 24 may store nautical chart information, location(s) registered by the user, a route created by the user, an additional scale registered by the user (details will be described later), various programs (e.g., a nautical chart display program), etc. The memory 24 may be a nonvolatile memory, such as a hard disk drive, a flash memory (a flash disk, a memory card, etc.), or an optical disc. The memory 24 may be comprised of one of the hardware described above, or may be comprised of a plurality of the hardware. For example, only the nautical chart information may be stored in the optical disc, and other information may be stored in the hard disk drive.

The processor 25 may be a processing unit such as an FPGA, an ASIC, or a CPU. The processor 25 may read the program stored in the memory 24 etc. to a RAM etc., and execute the program to execute various processings related to the nautical chart display device 20. Accordingly, the processor 25 may implement a display processing module 61, a registration processing module 62, a change processing module 63, and a display mode switching module 64.

Figure 3:
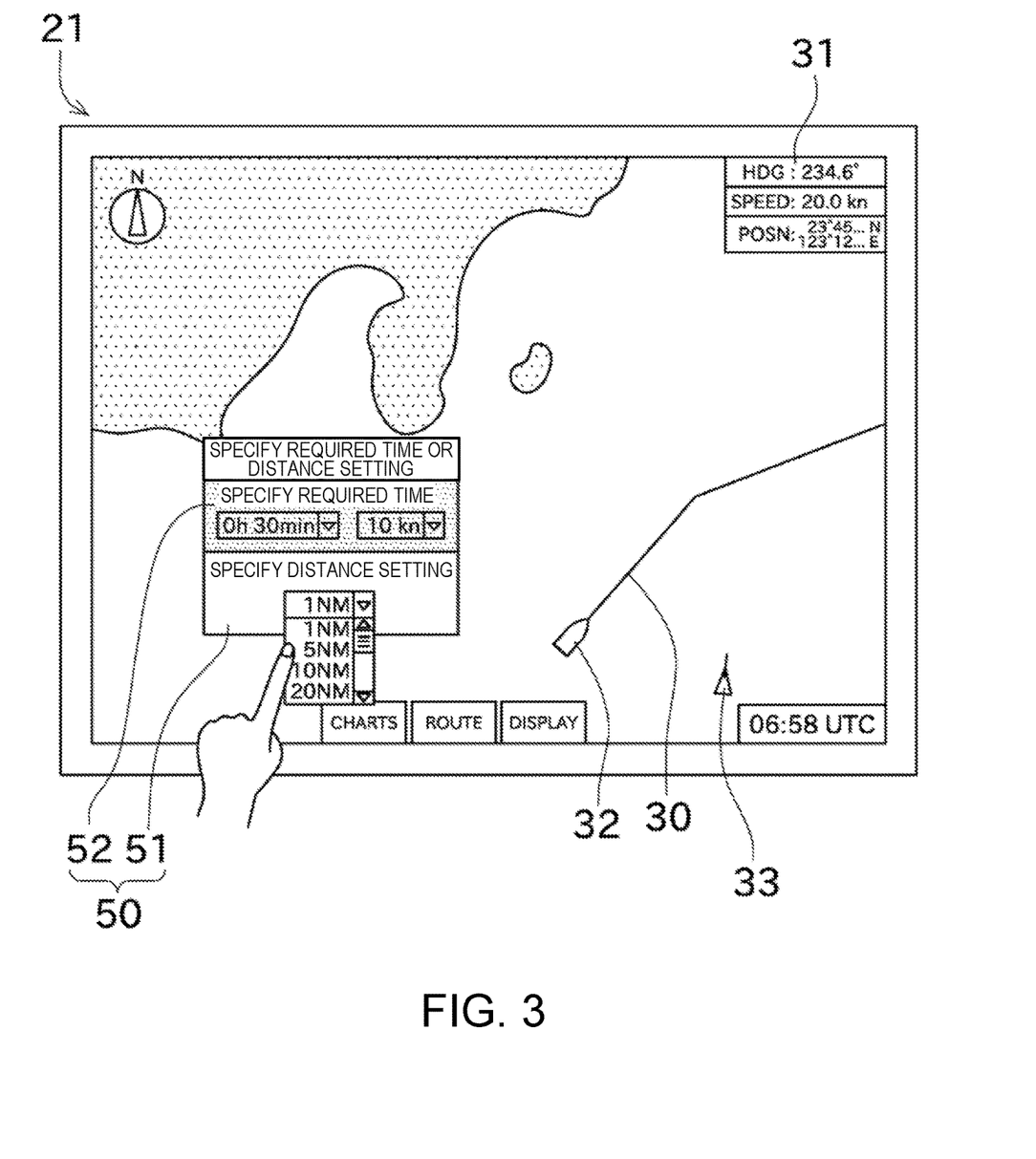
FIG. 3 is a view illustrating a screen when a distance setting or a required time is specified.

As illustrated in FIG. 3, the display processing module 61 may display on the display unit 21 the nautical chart, the route, etc. stored in the memory 24 according to the signal inputted into the input part 23. In FIG. 3, land areas are indicated by dots, a sea area is indicated by plain color, and the route is indicated by a reference character "30." Note that in this embodiment menu buttons for creating and displaying the route 30, etc. may be superimposed on the nautical chart. Moreover, the display processing module 61 may execute processing of, for example, displaying on the display unit 21 the various information received from the GPS receiver 11, the AIS receiver 12, and the bow direction sensor 13. In detail, as illustrated in FIG. 3, the display processing module 61 may display on the display unit 21, basic ship information 31 indicating the position, the bow direction, etc. of the ship by texts, a ship symbol 32 indicating on the nautical chart the position and the bow direction of the ship, and an AIS symbol 33 indicating on the nautical chart the position etc. of another ship acquired from the AIS information.

Moreover, the display processing module 61 may display a measurement result of a distance on the nautical chart (a single measured distance 56, a total measured distance 57, etc. which will be described later) measured by using a hand of the user in a method similar to using a divider. This processing is described in detail below. As described above, when measuring a distance of a measuring object on a paper nautical chart, the distance of the measuring object on the nautical chart may be measured by setting a span between two points of the divider to a given length on the nautical chart, and then obtaining how many times of the span of the divider the measuring object is. Typically, the span of the divider is set to a value which is easy to understand for the user (e.g., a multiple of five).

When the measuring method using the divider is applied to the nautical chart display device 20 of the touch-panel type, it may be considered, for example, to display a scale line on the electronic nautical chart, and use the scale line to set a span between two fingers of the user to a given length on the nautical chart. However, since it is difficult to maintain the same span between the two fingers, a measurement accuracy may easily be lowered in this method. Especially, when obtaining how many times of the span of the fingers the measuring object is, since it is required to move the fingers etc. on the screen, the span between the two fingers cannot be maintained. Therefore, the measurement accuracy may be lowered.

Considering this situation, in this embodiment, the span between the two fingers of the user may not be set to meet the scale line on the nautical chart illustrated at the existing scale, but the nautical chart may be displayed at a scale at which the span between the two fingers of the user matches with a corresponding distance on the nautical chart (hereinafter, referred to as an additional scale). Therefore, since the user can perform the measurement in a desired way of spreading fingers, a way of spreading fingers which is highly-reproducible of the span of fingers (e.g., spreading given two fingers to the limit) can be used. Thus, even if it becomes difficult to maintain the span between the two fingers, the same span can be reproduced. Thereby, the degradation of the measurement accuracy can be prevented.

Figure 2:
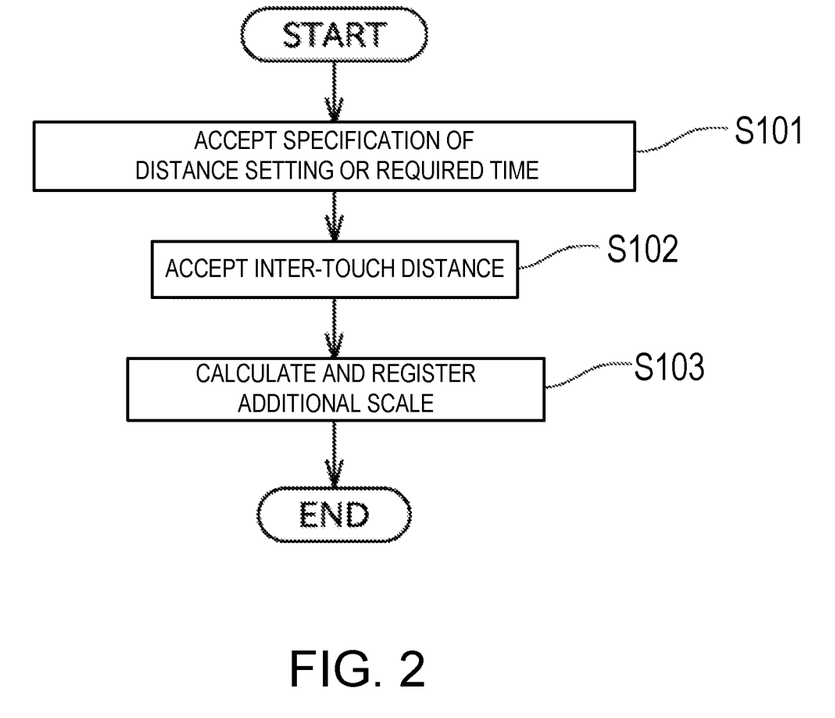
FIG. 2 is a flowchart illustrating a registration executed by a processor.
Figure 4:
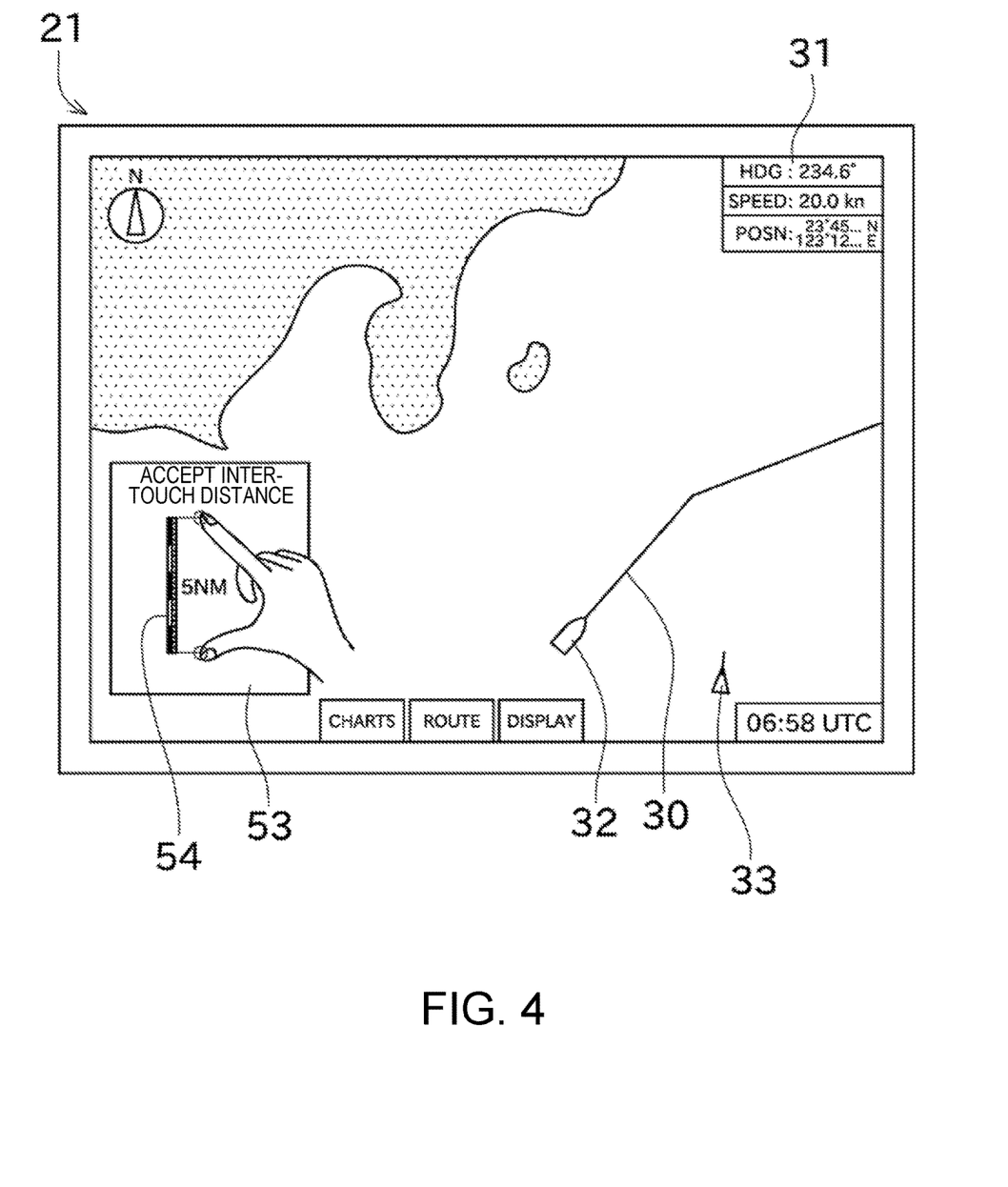
FIG. 4 is a view illustrating a screen when an inter-touch distance is registered.

First, a registration in which the additional scale is registered based on the span between the two fingers is described. FIG. 2 is a flowchart illustrating the registration executed by the processor 25 (the registration processing module 62). FIG. 3 is a view illustrating a screen when a distance setting or a required time is specified. FIG. 4 is a view illustrating a screen when an inter-touch distance is registered. Note that, although a span between a thumb and an index finger of the user (in more detail, the span between finger tips, which also applies hereinafter) is described below as an example, a span between other two fingers may be used. Moreover, in the nautical chart display device 20 of this embodiment, although the additional scale is registered by using the span between the two fingers of one hand, it is possible to register the additional scale by using other than the span between the two fingers of one hand.

First, when the registration processing module 62 accepts an instruction to register the additional scale (when an electrical signal indicating such an instruction is inputted into the input part 23), the registration processing module 62 may accept the specification of the distance setting or the required time (Step S101). The distance setting may be a distance on the nautical chart to associate with the span between the two fingers. The required time may be a period of time required for moving the distance on the nautical chart indicated by the span between the two fingers.

In detail, the registration processing module 62 may display a first window 50 on the display unit 21 for specifying the distance setting or the required time. The first window 50 may include a distance setting specification section 51 and a required time specification section 52. At least one of the distance setting and the required time may be set. Therefore, in FIG. 3, since the specification of the distance setting is in progress, the required time specification section 52 may be grayed-out. Although the required time specification section 52 allows the user to specify both the required time and a ship speed, the ship speed may be specified in advance, and only the required time may be specified in the required time specification section 52. The distance setting, the required time, the ship speed, etc. may be specified in a method in which a desired value is selected from a plurality of values as illustrated in FIG. 3, or in a method in which a desired value is inputted by the user. The distance setting may be specified in a method in which two points on the nautical chart are selected, and a distance therebetween on the nautical chart is set as the distance setting, instead of inputting or selecting a numerical value.

Next, the registration processing module 62 may accept the inter-touch distance (Step S102). The inter-touch distance may be a distance on the screen between two touched points. The distance on the screen may be described by a unit of a number of pixels, millimeters, etc.

In detail, as illustrated in FIG. 4, the registration processing module 62 may display a second window 53 for accepting the inter-touch distance. At this time, a reference scale line 54 of FIG. 4 may not be displayed. By the user touching two points in the second window 53 in a desired way of spreading the fingers, the reference scale line 54 may be displayed between the two touched points. The reference scale line 54 may be a scale line and a numerical value indicative of the distance setting or the required time specified in the preceding processing. By displaying the reference scale line 54, it may become possible for the user to intuitively grasp that the distance setting etc. specified in the preceding processing associates with the span between the fingers. Note that the display of the reference scale line 54 may be omitted.

The registration processing module 62 may be acceptable of the inter-touch distance even when the touches to the two points on the screen are detected simultaneously. Alternatively, the registration processing module 62 may be acceptable of the inter-touch distance when a touch to a first point on the screen is detected first, and then a touch to a second point on the screen is detected in the state where the first touch has been detected. Further, the registration processing module 62 may accept the inter-touch distance at the time of detecting two touched points, or may accept the inter-touch distance at a time when two touched points are detected, and then at least one of the touched points becomes undetectable (i.e., when the finger is separated from the screen). Furthermore, the registration processing module 62 may accept the touches to the two points on the nautical chart without displaying the second window 53.

Next, the registration processing module 62 may calculate and register the additional scale (Step S103). The additional scale may be a scale at which the distance setting or the required time specified at Step S101 associates with the inter-touch distance accepted at Step S102. Therefore, by performing a calculation such as dividing the inter-touch distance by the distance setting, the additional scale can be calculated. Note that, when the required time is specified instead of the distance setting, a distance which the ship moves during the required time at the specified ship speed (the distance setting) may be obtained. By displaying the nautical chart at the additional scale calculated as described above, the inter-touch distance accepted at Step S102 may match the distance setting etc. on the nautical chart. The registration processing module 62 may store the calculated additional scale in the memory 24.

Figure 5:
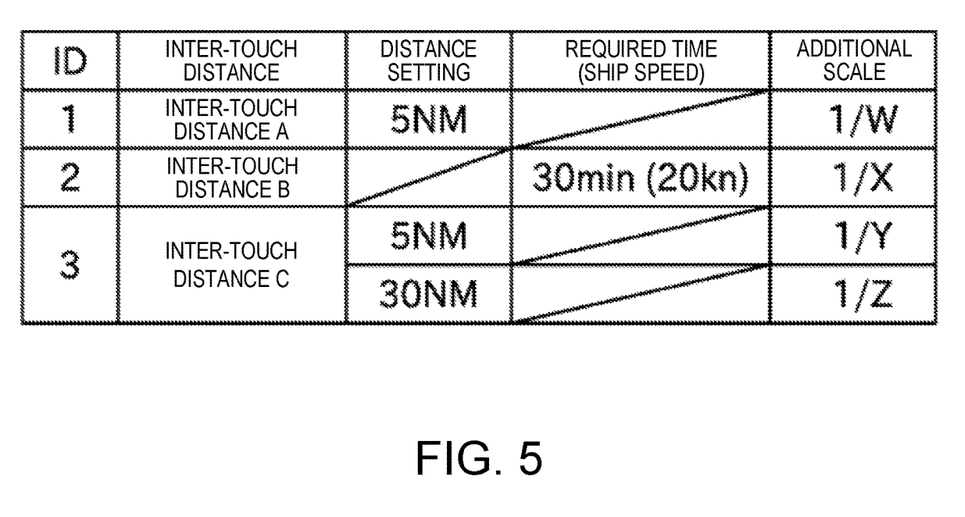
FIG. 5 is a table illustrating an additional scale and related information thereto stored in a memory.

Moreover, in this embodiment, a plurality of additional scales can be registered. The plurality of additional scales stored in the memory 24 are illustrated in FIG. 5, as an example. In the table of FIG. 5, a plurality of inter-touch distances (A-C) are described. Since the inter-touch distance differs depending on a size of user's hand etc., the plurality of inter-touch distances can be registered so that the inter-touch distance of the additional scale according to the respective users can be stored. Moreover, IDs may be provided to the respective inter-touch distances so that a switching of the additional scale of one user to that of another user becomes possible (the inter-touch distances are distinguished by using the IDs). Referring to ID "3" in FIG. 5, a plurality of distance settings may be registered for the same inter-touch distance. Accordingly, the nautical chart display device 20 can be applied for both the cases where the user wants to measure a short distance at a larger scale, and where the same user wants to measure a long distance at a smaller scale. As described above, in this embodiment, the plurality of additional scales with different inter-touch distances or the distance settings (required times) may be registered. Therefore, when displaying the nautical chart at the additional scale, for example, a list or the IDs of the additional scales may be displayed so that the additional scale to be applied can be selected.

Figure 6:
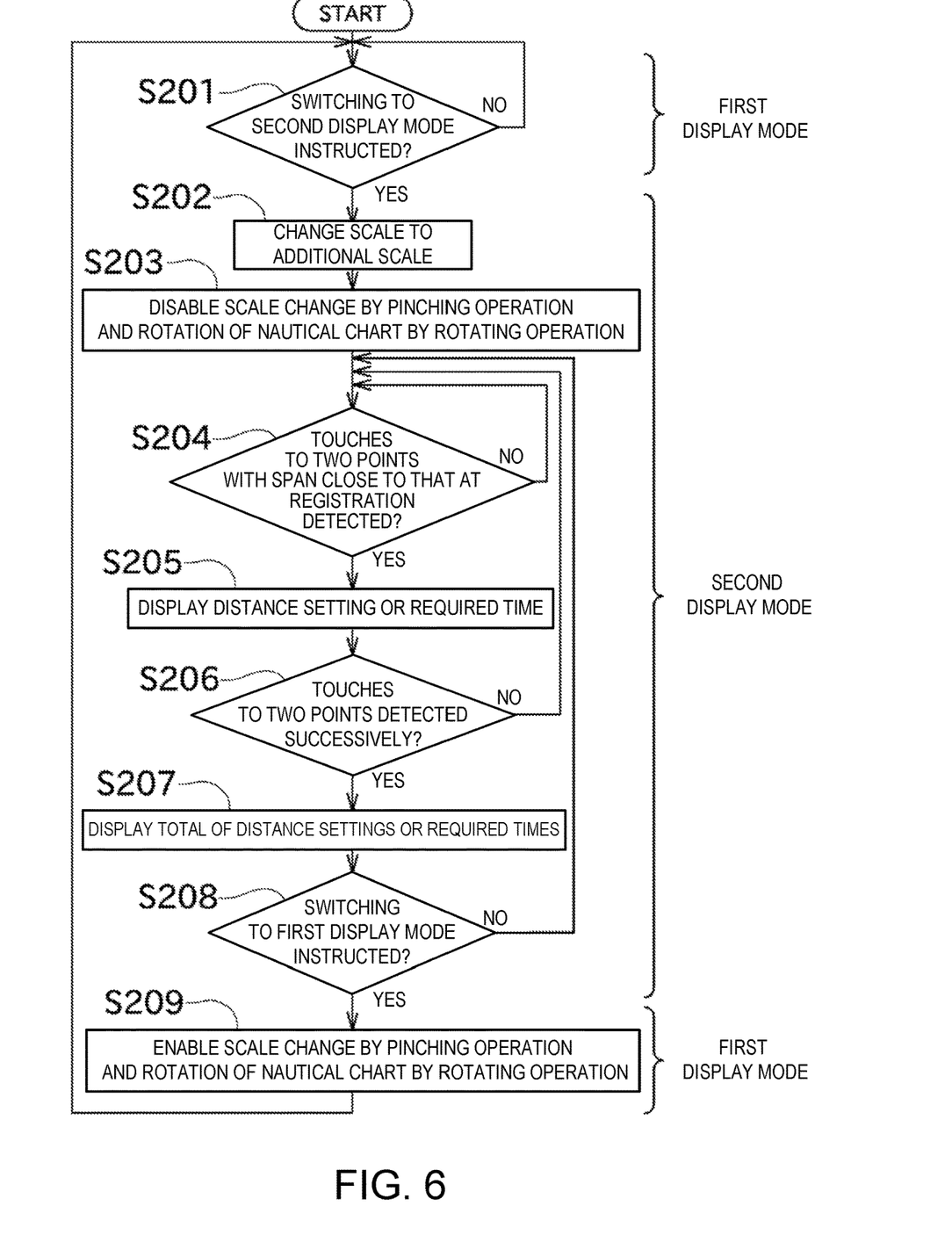
FIG. 6 is a flowchart illustrating processings executed by the processor, such as changing to the additional scale and switching a display mode.
Figure 7:
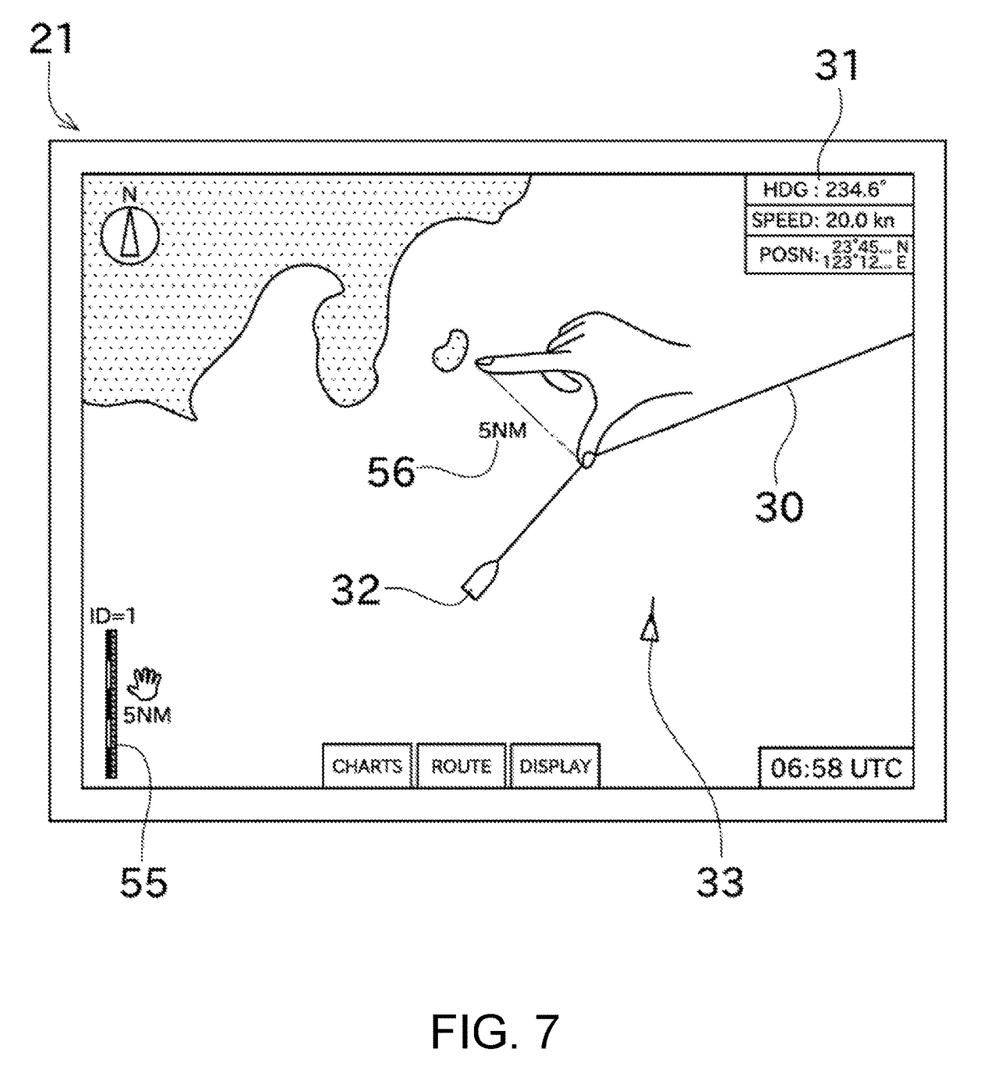
FIG. 7 is a view illustrating a situation in which a distance on a nautical chart is measured by using a span between fingers in a second display mode.
Figure 8:
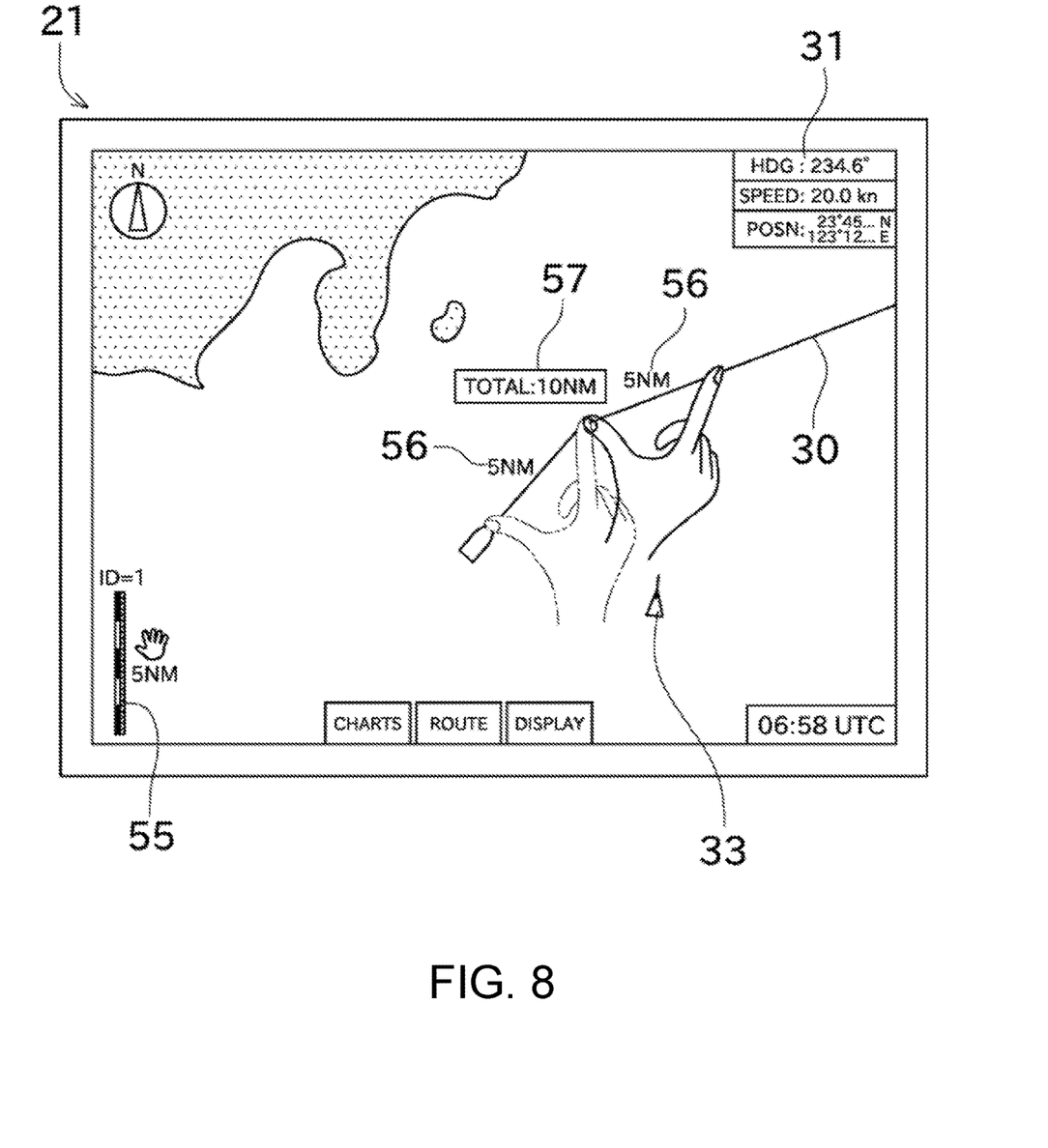
FIG. 8 is a view illustrating a situation in which the distance on the nautical chart is measured by using the span between the fingers a plurality of times in the second display mode.

Next, processing to display the nautical chart at the registered additional scale is described with reference to FIGS. 6 to 8. FIG. 6 is a flowchart illustrating processing executed by the processor 25, such as changing the scale to the additional scale and switching a display mode. FIG. 7 is a view illustrating a situation in which the distance on the nautical chart is measured by using the span between the fingers in a second display mode. FIG. 8 is a view illustrating a situation in which the distance on the nautical chart is measured by using the span between the fingers a plurality of times in the second display mode.

The display mode switching module 64 may be switchable of display modes between a first display mode in which the scale is freely changeable, and the second display mode in which the nautical chart is displayed at the additional scale. The first display mode may be a typical method for displaying the nautical chart, which is used for various purposes. On the other hand, the second display mode may be a mode in which the nautical chart may be displayed at the additional scale, and a primary purpose thereof may be to measure the distance on the nautical chart by user's hand. As described above, the nautical chart display device 20 of this embodiment may be provided with the display mode in which the nautical chart is displayed at the additional scale, and execute different processing with respect to user's touch operation according to the display mode (e.g., disabling the change of the scale by the pinching operation in the second display mode).

Note that the nautical chart display device 20 may display the nautical chart without distinguishing the display modes. In such a case, when selecting the scale, in addition to the existing scale (e.g., a typical scale of 1:50000 or 1:200000), the additional scale may be displayed as a proposed scale. Alternatively, a button used for applying the additional scale (e.g., a button displayed on the screen) may be provided. The nautical chart display device 20 may be set so that, when the scale is changed by the pinching operation and it becomes close to the additional scale, the scale automatically becomes the additional scale. Note that, if the display modes are not distinguished, the change of the scale by the pinching operation etc. may not be disabled, and therefore, the display of the nautical chart at the additional scale may be finished by performing the pinching operation.

When the nautical chart is displayed in the first display mode, the processor 25 may determine whether switching to the second display mode is instructed (Step S201). If the switching to the second display mode is instructed, the display mode switching module 64 may switch the mode to the second display mode, and the change processing module 63 may change the scale to the additional scale (Step S202). Note that, if the plurality of additional scales are registered, the change processing module 63 may change the scale to a specified additional scale. Moreover, in the second display mode, a distance setting scale line 55 may be displayed as illustrated in FIG. 7 so that it becomes easier for the user to know that the current scale is the additional scale. The distance setting scale line 55 may have a length corresponding to the distance setting which associates with the additional scale. Moreover, around the distance setting scale line 55, the distance setting (the numerical value), the ID indicating the user, an icon of a hand which makes it easier for the user to know that it is in the mode for measuring by hand, etc. may be displayed. Only one of them may be displayed. If the required time is set instead of the distance setting, the required time may be displayed.

In the second display mode, the processor 25 may disable the change of the scale by the pinching operation, and disable the rotation of the nautical chart by the rotating operation (Step S203). If the change of the scale on the nautical chart by the pinching operation is enabled in the second display mode, it is possible that the scale is slightly changed when the user touches two points on the nautical chart for measuring the distance (or when separating the finger(s) etc. touching on the screen therefrom, after measuring the distance). Moreover, if the rotation of the nautical chart by the rotating operation is enabled, it may be considered that the nautical chart frequently rotates when measuring the distance. For example, when measuring a length of polygonal-like lines by touching the nautical chart with the thumb and the index finger, and rotating the index finger centering on the thumb to change the position of the index finger while maintaining the position of the thumb (i.e., by pivotally rotating the index finger), the nautical chart may be rotated. Therefore, in the second display mode the change of the scale by the pinching operation, and the rotation of the nautical chart by the rotating operation may be disabled.

Moreover, when the nautical chart is displayed in the second display mode and there are two touched points, the processor 25 may calculate the inter-touch distance therebetween. Hereinafter, the inter-touch distance detected during the display of the nautical chart may be referred to as a "detected inter-touch distance." Moreover, the inter-touch distance accepted at Step S102 (the inter-touch distance used for registering the additional scale and stored in the memory 24) may be referred to as a "registered inter-touch distance."

The processor 25 may determine whether two touched points with a span therebetween approximate to the registered inter-touch distance are detected (whether the detected inter-touch distance is approximate to the registered inter-touch distance) (Step S204). If the detected inter-touch distance is determined to be approximate to the registered inter-touch distance (Step S204: YES), as illustrated in FIG. 7, the display processing module 61 may display the single measured distance 56 near the detected touched points (Step S205). The single measured distance 56 may be a numeric value indicating the same length as the distance setting. Although the user registers the span between the two fingers in the highly reproducible method of the inter-touch distance, it may almost be impossible to reproduce the inter-touch distance exactly the same as the inter-touch distance at the time of the registration of the additional scale. Therefore, even when the detected inter-touch distance is approximate to the registered inter-touch distance, the single measured distance 56 may be displayed. Displaying the single measured distance 56 may make it easier for the user to intuitively grasp the distance of the measuring object. Note that the single measured distance 56 may be indicated by a scale line in addition or alternative to the numerical value. If the required time is set instead of the distance setting, the required time may be displayed. Note that both of the distance setting and the required time may be displayed.

Moreover, the processor 25 may determine whether the two touched points with the span therebetween approximate to the registered inter-touch distance are detected successively (Step S206). In detail, the processor 25 may determine whether (1) all the detected inter-touch distances which are detected successively are approximate to the registered inter-touch distance, and whether (2) the points of the touches detected successively continue (e.g., if the touching is performed three times, a second point of a first touch matches a first point of a second touch, and a second point of the second touch matches a first point of a third touch). If the processor 25 determines that both of the conditions described above are satisfied, as illustrated in FIG. 8, the display processing module 61 may display the total measured distance 57 corresponding to a total of the detected inter-touch distances which are detected successively (Step S207). If the required time is set instead of the distance setting, a total of the required times may be displayed. Note that both of the total of the distance settings and the total of the required times may be displayed.

Moreover, the processor 25 may determine whether switching to the first display mode is instructed (Step S208). When the switching to the first display mode is instructed, the display mode switching module 64 may switch the mode to the first display mode, and enable the change of the scale by the pinching operation and the rotation of the nautical chart by the rotating operation (Step S209). Then, the processor 25 may execute the determination at Step S201 again.

As described above, the nautical chart display device 20 of this embodiment may include the display unit 21, the operation detector 22, the registration processing module 62, and the change processing module 63, and execute the nautical chart display program to implement the nautical chart display method according to the present disclosure. The display unit 21 may include the screen and display the nautical chart on the screen. The operation detector 22 may detect the touch operation to the screen. The registration processing module 62 may register the scale at which the inter-touch distance of the two points on the screen matches the distance setting on the nautical chart as the additional scale. The change processing module 63 may change the scale of the nautical chart to the additional scale.

Accordingly, since the additional scale can be registered by touching two points with an arbitrary span therebetween, the additional scale can be registered, for example, by using the span between the two fingers when the hand is open. Therefore, the nautical chart can be displayed at the additional scale corresponding to the size of user's hand etc. By displaying the nautical chart at the registered additional scale, the distance on the nautical chart can be measured by using user's hand in the method similar to using the divider.

According to the nautical chart display device 20 of this embodiment, the registration processing module 62 may accept the specification of the distance and set the specified distance as the distance setting.

Therefore, the additional scale can be registered by using the distance setting desired by the user by inputting or selecting the desired distance.

According to the nautical chart display device 20 of this embodiment, the registration processing module 62 may accept the specification of the required time, and set the distance which the ship moves during the required time at the specified ship speed as the distance setting.

Therefore, the additional scale can be registered by using the required time desired by the user, by inputting or selecting the required time desired by the user.

According to the nautical chart display device 20 of this embodiment, the display mode switching module 64 may switch the modes between the first display mode and the second display mode. In the first display mode, the nautical chart may be displayed and the change of the scale by the pinching operation to the screen may be accepted. In the second display mode, the nautical chart may be displayed at the additional scale, and the change of the scale by the pinching operation may not be accepted.

Therefore, when displaying the nautical chart in the second display mode, and measuring the distance on the nautical chart by using user's hand, it can be prevented that the scale is unintentionally changed from the additional scale.

According to the nautical chart display device 20 of this embodiment, in the first display mode the rotation of the nautical chart by the rotating operation to the screen may be accepted. On the other hand, in the second display mode the rotation of the nautical chart by the rotating operation to the screen may not be accepted.

Therefore, when measuring the distance on the nautical chart by using user's hand, it can be prevented that the nautical chart is unintentionally rotated.

According to the nautical chart display device 20 of this embodiment, when the nautical chart is displayed at the additional scale, and the processor 25 determines that the detected inter-touch distance, which is the inter-touch distance of the two points detected by the operation detector 22, is approximate to the registered inter-touch distance, which is the inter-touch distance of the two points accepted at the registration of the additional scale, the display processing module 61 may display at least one of the distance setting and the required time required for moving the distance setting near the detected touched points.

Therefore, since the distance setting etc. is displayed by touching the screen with the span of the fingers which is accepted at the registration of the additional scale, the user can easily measure the distance on the nautical chart by using his/her hand. Especially, even if the detected inter-touch distance and the registered inter-touch distance are slightly different, the distance setting may be displayed, and thereby, it may become easier for the user to measure how many times of the distance setting etc. the measuring object is.

According to the nautical chart display device 20 of this embodiment, when the detected inter-touch distances detected successively are all approximate to the registered inter-touch distance, and when the points of the detected touches continue, the display processing module 61 may display at least one of the total distance settings and the total required times which correspond to the total of the detected inter-touch distances detected successively.

Therefore, it may become further easier for the user to measure how many times of the distance setting etc. the measuring object is.

Moreover, the nautical chart display device 20 of this embodiment may include the memory 24 which stores the plurality of additional scales. The change processing module 63 may change the scale of the nautical chart to the specified additional scale among the plurality of additional scales.

Since the additional scale is stored, the registration of the additional scale may not be required every time. Especially, the plurality of additional scales may be stored so that the plurality of additional scales different in the registered user, the way of spreading fingers, scale, etc. can be registered and stored in advance, thus, a subsequent registration of the additional scale may not be required.

According to the nautical chart display device 20 of this embodiment, the plurality of distance settings may be stored for every inter-touch distance in the memory 24.

Therefore, the nautical chart display device 20 can be applied for both the cases where the user wants to measure the long distance and the user wants to measure the short distance on the nautical chart by using his/her hand.

According to the nautical chart display device 20 of this embodiment, the distance setting may be registered for each of the plurality of inter-touch distances in the memory 24.

Accordingly, since the spans between the fingers of the plurality of users can be registered for example, even when the plurality of users use the nautical chart display device 20, the respective users can measure the distance on the nautical chart by using his/her hand.

Although the suitable embodiment of the present disclosure is described above, the above configurations may be changed as follows.

The description in the flowcharts of FIGS. 2 and 6 is one example, and the order of the processings may be changed, a part of the processings may be omitted, or another processing may be added. For example, the order of the processings at Step S101 and Step S102 may be changed. In this case, the inter-touch distance may first be accepted, and then the distance setting or the required time associating with the inter-touch distance may be specified.

Although the nautical chart display device 20 according to the embodiment described above is disposed so that the screen thereof becomes parallel to the horizontal plane, it may be disposed at a different angle.

Although, in the embodiment described above, the present disclosure is applied to the nautical chart display device which mainly displays the electronic nautical chart, the present disclosure may be applied to a display device capable of displaying a radar image, an image from a fish finder, etc. in addition to the electronic nautical chart.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What we claimed is:

1. A nautical chart display device, comprising:
a display unit having a screen and configured to display a nautical chart at a scale on the screen;
an operation detector configured to detect a touch operation of two points to the screen and an inter-touch distance between the two points to the screen;
a memory configured to store a plurality of additional scales for a plurality of predetermined inter-touch distances, including at least a first additional scale and a second additional scale for a first predetermined inter-touch distance and a second predetermined inter-touch distance, respectively; and
processing circuitry configured
to accept a user input to set the first predetermined inter-touch distance and the second predetermined inter-touch distance;
to register a scale between the two points to the screen;
to identify a specified additional scale among the plurality of additional scales as being within less than 10% of the registered scale;
responsive to identifying the first additional scale as the specified additional scale, to change the scale of the nautical chart to the first additional scale;
responsive to identifying the second additional scale as the specified additional scale, to change the scale of the nautical chart to the second additional scale; and
to display the nautical chart at the specified additional scale on the screen.

2. The nautical chart display device of claim 1, wherein the processing circuitry further:

accepts a specification of a distance;
sets the specified distance as one of a plurality of distance settings;
identifies a specified scale among the plurality of additional scales that corresponds to the one of the plurality of distance settings;
responsive to identifying the specified scale, changes the scale of the nautical chart to the specified scale; and
displays the nautical chart at the specified scale.

3. The nautical chart display device of claim 2, the processing circuitry is further configured to switch display modes between:
   a first display mode in which the nautical chart is displayed and a change of the scale by a pinching operation to the screen is accepted; and
   a second display mode in which the nautical chart is displayed at the specified additional scale, and the change of the scale by the pinching operation is not accepted.

4. The nautical chart display device of claim 3, wherein in the first display mode a rotation of the nautical chart by a rotating operation to the screen is accepted, and
   wherein in the second display mode the rotation of the nautical chart by the rotating operation to the screen is not accepted.

5. The nautical chart display device of claim 1, wherein the processing circuitry is further configured to switch display modes between:
   a first display mode in which the nautical chart is displayed and a change of the scale by a pinching operation to the screen is accepted; and
   a second display mode in which the nautical chart is displayed at the specified additional scale, and the change of the scale by the pinching operation is not accepted.

6. The nautical chart display device of claim 5, wherein in the first display mode a rotation of the nautical chart by a rotating operation to the screen is accepted, and
   wherein in the second display mode the rotation of the nautical chart by the rotating operation to the screen is not accepted.

7. The nautical chart display device of claim 6, wherein the processing circuitry is further configured to:
   display on the display unit at least one of a plurality of distance settings and a required time required for a ship moving the one of the plurality of distance settings when displaying the nautical chart at the specified additional scale on the screen.

8. The nautical chart display device of claim 7, wherein the processing circuitry displays, responsive to detecting continuous touch operations and successively detected inter-touch distances which are approximate to the registered inter-touch distance, at least one of a total distance setting and a total required time corresponding to a total of the successively detected inter-touch distances.

9. A method of displaying a nautical chart, comprising:
   storing a plurality of additional scales for a plurality of predetermined inter-touch distances, including at least a first additional scale and a second additional scale for a first predetermined inter-touch distance and a second predetermined inter-touch distance, respectively;
   displaying the nautical chart at a scale on a screen of a display unit;
   detecting a touch operation of two points to the screen and an inter-touch distance between the two points to the screen;
   accepting a user input to set the first predetermined inter-touch distance and the second predetermined inter-touch distance;
   registering a scale between the two points to the screen;
   identifying a specified additional scale among the plurality of additional scales as being within less than 10% of the registered scale;
   responsive to identifying the first additional scale as the specified additional scale, changing the scale of the nautical chart to the first additional scale;
   responsive to identifying the second additional scale as the specified additional scale, changing the scale of the nautical chart to the second additional scale; and
   displaying the nautical chart to the screen of the display unit at the specified additional scale.

10. The method of claim 9, further comprising:
    accepting a specification of a distance;
    setting the specified distance as one of a plurality of distance settings;
    identifying a specified scale among the plurality of additional scales that corresponds to the one of the plurality of distance settings;
    responsive to identifying the specified scale, changing the scale of the nautical chart to the specified scale; and
    displaying the nautical chart at the specified scale.

11. The method of claim 9, further comprising:
    switching display modes between:
       a first display mode in which the nautical chart is displayed and a change of the scale by a pinching operation to the screen is accepted; and
       a second display mode in which the nautical chart is displayed at the specified additional scale, and the change of the scale by the pinching operation is not accepted.

12. The method of claim 11,
    wherein in the first display mode, a rotation of the nautical chart by a rotating operation to the screen is accepted, and
    wherein in the second display mode, the rotation of the nautical chart by the rotating operation to the screen is not accepted.

13. The method of claim 12, further comprising:
    displaying on the display unit at least one of a plurality of distance settings and a required time required for a ship moving the one of the plurality of distance settings when displaying the nautical chart at the specified additional scale on the screen.

14. The method of claim 13, further comprising:
    displaying, responsive to detecting continuous touch operations and successively detected inter-touch distances which are approximate to the registered inter-touch distance, at least one of a total distance setting and a total required time corresponding to a total of the successively detected inter-touch distances.

15. A non-transitory computer-readable recording medium storing a control program causing a processor of a nautical chart display device to execute processing, the processor configured to control operation of the device, the processing comprising:
    storing a plurality of additional scales for a plurality of predetermined inter-touch distances, including at least a first additional scale and a second additional scale for a first predetermined inter-touch distance and a second predetermined inter-touch distance, respectively;
    displaying the nautical chart at a scale on a screen of a display unit;

detecting a touch operation of two points to the screen and an inter-touch distance between the two points to the screen;

accepting a user input to set the first predetermined inter-touch distance and the second predetermined inter-touch distance;

registering a scale between the two points to the screen;

identifying a specified additional scale among the plurality of additional scales as being within less than 10% of the registered scale;

responsive to identifying the first additional scale as the specified additional scale, changing the scale of the nautical chart to the first additional scale;

responsive to identifying the second additional scale as the specified additional scale, changing the scale of the nautical chart to the specified additional scale;

displaying the nautical chart to the screen of the display unit at the specified additional scale.

16. The non-transitory computer-readable recording medium of claim 15, the processing further comprising:

accepting a specification of a distance;

setting the specified distance as one of a plurality of distance settings;

identifying a specified scale among the plurality of additional scales that corresponds to the one of the plurality of distance settings;

responsive to identifying the specified scale, changing the scale of the nautical chart to the specified scale; and displaying the nautical chart at the specified scale.

17. The non-transitory computer-readable recording medium of claim 15, the processing further comprising:

switching display modes between:

a first display mode in which the nautical chart is displayed and a change of the scale by a pinching operation to the screen is accepted; and a second display mode in which the nautical chart is displayed at the specified additional scale, and the change of the scale by the pinching operation is not accepted.

18. The non-transitory computer-readable recording medium of claim 17, wherein in the first display mode, a rotation of the nautical chart by a rotating operation to the screen is accepted, and wherein in the second display mode, the rotation of the nautical chart by the rotating operation to the screen is not accepted.

19. The non-transitory computer-readable recording medium of claim 18, the processing further comprising:

displaying on the display unit at least one of a plurality of distance settings and a required time required for a ship moving the one of the plurality of distance settings when displaying the nautical chart at the specified additional scale on the screen.

20. The non-transitory computer-readable recording medium of claim 19, the processing further comprising:

displaying, responsive to detecting continuous touch operations and successively detected inter-touch distances which are approximate to the registered inter-touch distance, at least one of a total distance setting and a total required time corresponding to a total of the successively detected inter-touch distances.

* * * * *